(12) United States Patent
Chaizy

(10) Patent No.: US 10,892,077 B2
(45) Date of Patent: Jan. 12, 2021

(54) MAGNETO-MECHANICAL CLAMPING DEVICE

(71) Applicant: INELXIA LIMITED, Oxfordshire (GB)

(72) Inventor: Patrick Andre Chaizy, Oxfordshire (GB)

(73) Assignee: INELXIA LIMITED, Oxfordshire (GB)

( * ) Notice: Subject to any disclaimer, the term of this patent is extended or adjusted under 35 U.S.C. 154(b) by 0 days.

(21) Appl. No.: 16/693,601

(22) Filed: Nov. 25, 2019

(65) Prior Publication Data

US 2020/0090847 A1 Mar. 19, 2020

Related U.S. Application Data

(63) Continuation of application No. 15/325,505, filed as application No. PCT/GB2015/052015 on Jul. 13, 2015, now Pat. No. 10,490,330.

(30) Foreign Application Priority Data

Jul. 11, 2014 (GB) .................................. 1412381.4
Jul. 11, 2014 (GB) .................................. 1412386.3

(51) Int. Cl.
*H01F 7/02* (2006.01)
*F16B 2/12* (2006.01)

(52) U.S. Cl.
CPC ............. *H01F 7/0252* (2013.01); *F16B 2/12* (2013.01); *H01F 7/0263* (2013.01)

(58) Field of Classification Search
CPC ......... H01F 7/0252; H01F 7/0263; F16B 2/12
See application file for complete search history.

(56) References Cited

U.S. PATENT DOCUMENTS

| 6,477,749 | B1 | 11/2002 | Reiter |
| 2005/0023841 | A1 | 2/2005 | Chen |
| 2009/0250574 | A1 | 10/2009 | Fullerton et al. |
| 2009/0278642 | A1 | 11/2009 | Fullerton et al. |
| 2010/0283269 | A1 | 11/2010 | Fiedler |
| 2010/0308605 | A1 | 12/2010 | Fiedler |
| 2011/0138583 | A1 | 6/2011 | Fiedler |
| 2011/0298227 | A1 | 12/2011 | Fiedler |

FOREIGN PATENT DOCUMENTS

| CN | 1206490 | A | 1/1999 |
| EP | 0866476 | A1 | 9/1998 |
| WO | 2008006357 | A2 | 1/2008 |
| WO | 2009092368 | A2 | 7/2009 |
| WO | 2010084191 | A1 | 7/2010 |
| WO | 2012160195 | A2 | 11/2012 |
| WO | 2013190070 | A2 | 12/2013 |

*Primary Examiner* — Mohamad A Musleh
(74) *Attorney, Agent, or Firm* — Saul Ewing Arnstein & Lehr LLP

(57) ABSTRACT

A clamping mechanism comprising: a first part; a clamp coupled to said first part to enable the clamp to slide relative to said first part in a first linear direction, the clamp being provided with a first magnetic component; a second part for clamping by said clamp, the second part being provided with a second magnetic component. The mechanism is configured such that movement of the clamp in said first linear direction, between a clamping and an unclamped position, is effected by movement of the first part and the clamp, relative to said second part, in a second linear direction substantially orthogonal to said first linear direction as a result of alignment and misalignment of the magnetic components.

8 Claims, 6 Drawing Sheets

MAGNETO-MECHANICAL CLAMPING DEVICE

CROSS-REFERENCE TO RELATED APPLICATIONS

This application is a continuation of U.S. application Ser. No. 15/325,505, filed on Jan. 11, 2017, which claims the priority of International Application No. PCT/GB2015/052015, filed on Jul. 13, 2015, which claims priority to GB Application No. 1412381.4, filed Jul. 11, 2014, and GB Application No. 1412386.3, filed Jul. 11, 2014, the entire contents of each of which are fully incorporated herein by reference.

TECHNICAL FIELD

The present invention relates to a magneto-mechanical clamping device.

BACKGROUND

Various magnetic fixing arrangements are described in the following documents: U.S. Pat. No. 8,368,494, WO/2012/160195, DE145325.

SUMMARY

Aspects of the invention are set out in the appended claims.

Figure 4:
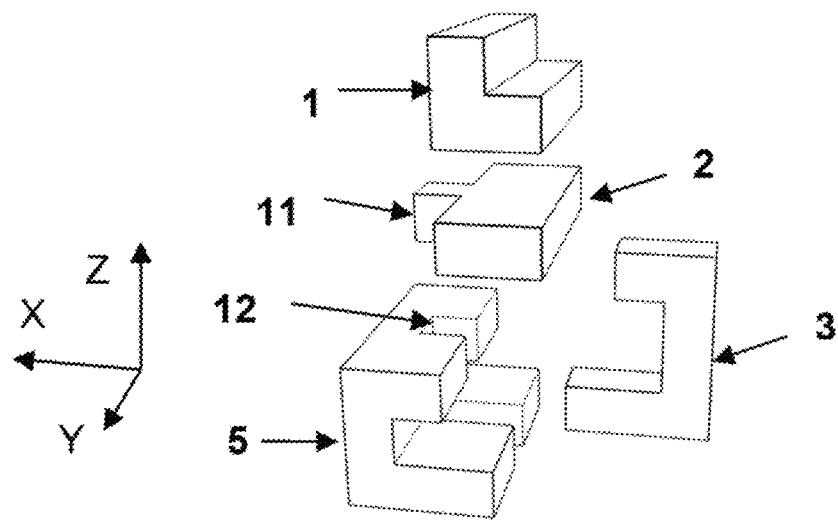
FIG. 4 is an exploded view of an embodiement requiring two-step actuation.

With the exception of FIG. 4, each of the figures shows the clamping mechanism in a sequence including at least different configuration (*a*) to (*d*).

Each of the figures shows the clamping mechanism in a sequence of different configurations (a) to (d).

DETAILED DESCRIPTION

A first part (1) is prevented to move relatively to a second part (2), along a $1^{st}$ direction (Z), by a third part (3) that clamps the two parts (1) and (2). The third part (3) can move from a clamping to an unclamping position and vice versa. The motion, along a $2^{nd}$ direction (X), of the third part (3) to its clamping position is activated by a magnetic force. In addition, this magnetic force can be used as a way of maintaining the system clamped and/or as a force that guides the path of the first part (1) relatively to the second (2) and third part (3) during the clamping process. The motion, along the $2^{nd}$ direction (X), of the third part (3) to its unclamping position is activated by a force that is triggered by moving, along a $3^{rd}$ direction (Y), the third part (3) relatively to the first part (1).

Figure 1:
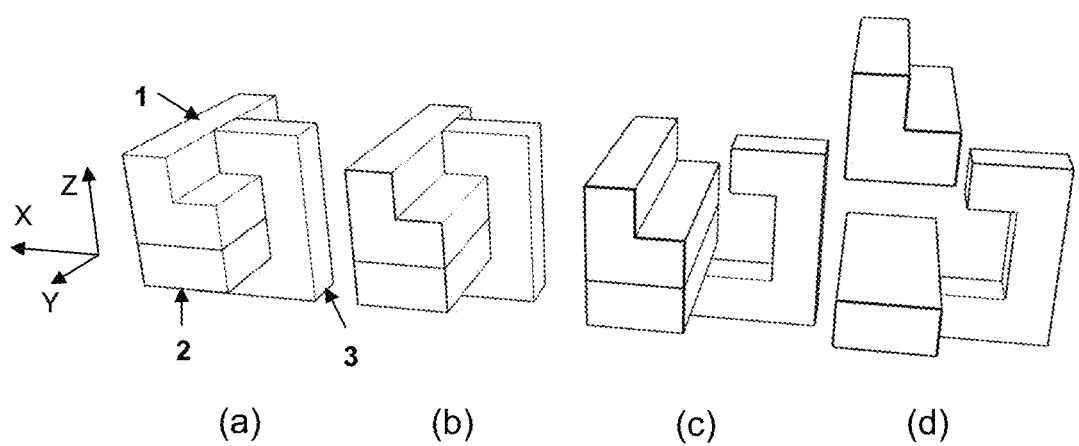
FIG. 1 is a perspective view of an embodiment of a clamping device, illustrating a clamped and an unclamped position, in which the actuation motion is linear.

FIG. 1 illustrates the principle of the mechanism. It provides a sequence of actions described next. From left to right, the system goes from clamped to unclamped. First, the first part (1) and the second part (2) are prevented to move, relatively to each other's, along the Z direction by clamp (3); the system is said to be clamped. Second, clamp (3) is moved, relatively to the first part (1), along the Y direction; this motion is called, hereafter, the actuation motion. Third, this actuation motion enables a force to move clamp (3) away from the two parts (1) and (2); the system is said to be unclamped.

Inversely, from right to left, the system goes from unclamped to clamped. First and second, the first part (1) and the second part (2) are moved closer to each other's along the Z direction; clamp (3) is unclamped and in the vicinity of the second part (2). Third, when the two parts (1) and (2) are closed enough to each other's, the magnetic force acting on both the first part (1) and clamp (3) moves clamp (3) closer to the two parts (1) and (2). As a result the first (1) and second (2) parts are prevented to move along the Z direction, relatively to each other's, by clamp (3); the system is clamped.

However, clamp (3) needs to move in the Y direction to align itself with its final clamping position before or when it starts moving in the +X direction. Otherwise, clamp (3) will still be maintained away from the first (1) and second (2) parts by the unclamping force. This motion of clamp (3) in the Y direction can be activated by the magnetic force that pulls clamp (3) towards the first (1) and second (2) parts or by another force (e.g. a manual force, another magnetic force, a spring etc. . . . ).

By definition, a paramagnetic material is only attracted when in the presence of an externally applied magnetic field, a diamagnetic material is repelled by magnetic fields, an antimagnetic material is impervious to the effect of a magnetic field, and a ferromagnetic material is used to make magnet or is attracted to magnets.

The clamping magnetic force is generated by two magnetic components. One of the components, hereafter called the first magnetic component, is a magnet. The other one, hereafter called the second magnetic component, is either a magnet or made of ferromagnetic/paramagnetic material. One magnetic component is located on the first part (1) and the second one on the clamp (3). Thus when the first part (1) moves closer to the second part (2) and to clamp (3) the magnetic force will gain strength up to the point that it is strong enough to move clamp (3) in its clamping position.

In order to unclamp the system, the motion of clamp (3) along the Y direction either reduces (i.e. modulates) the strength or reverse the direction of the clamping magnetic force. If the clamping magnetic force is reversed then the second magnetic component is either another magnet, or is made of some diamagnetic material. If the second magnetic component is also a magnet, i.e. if it is not made of a diamagnetic material, then the magnetic orientation of the first and second magnets must be such that the two magnets push each other away after the actuation motion has been executed. If the clamping magnetic force is reduced then the unclamping force is already presents when the system is clamped but its strength is lower than the magnetic force one. It is only when the strength of the magnetic force has reduced enough that clamp (3) can be moved away from the two parts (1) and (2) by this unclamping force (typically a force generated by a spring).

When in their clamping position, there will be a gap between the surfaces of the clamps (3) and of the parts (1) and (2) that face each other's. This gap is due to the unavoidable manufacturing tolerances. It allows the parts (1) and (2) to move relatively to each other's and relatively to the clamps (3) in the Z direction. This motion can be prejudicial even if it is small (typically 0.1 mm). In order to remove this gap, the surfaces can be bevelled relatively to the (X,Y) plan.

Figure 2A:
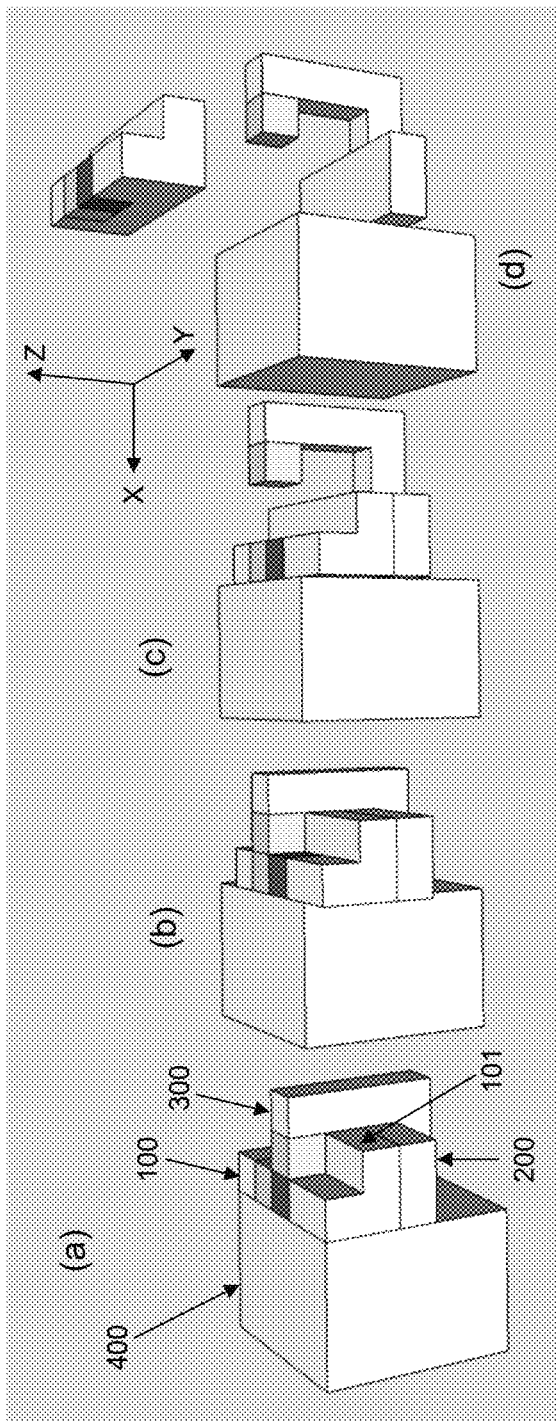
FIGS. 2A-2C further illustrate a linear clamping and unclamping mechanism.
Figure 2B:
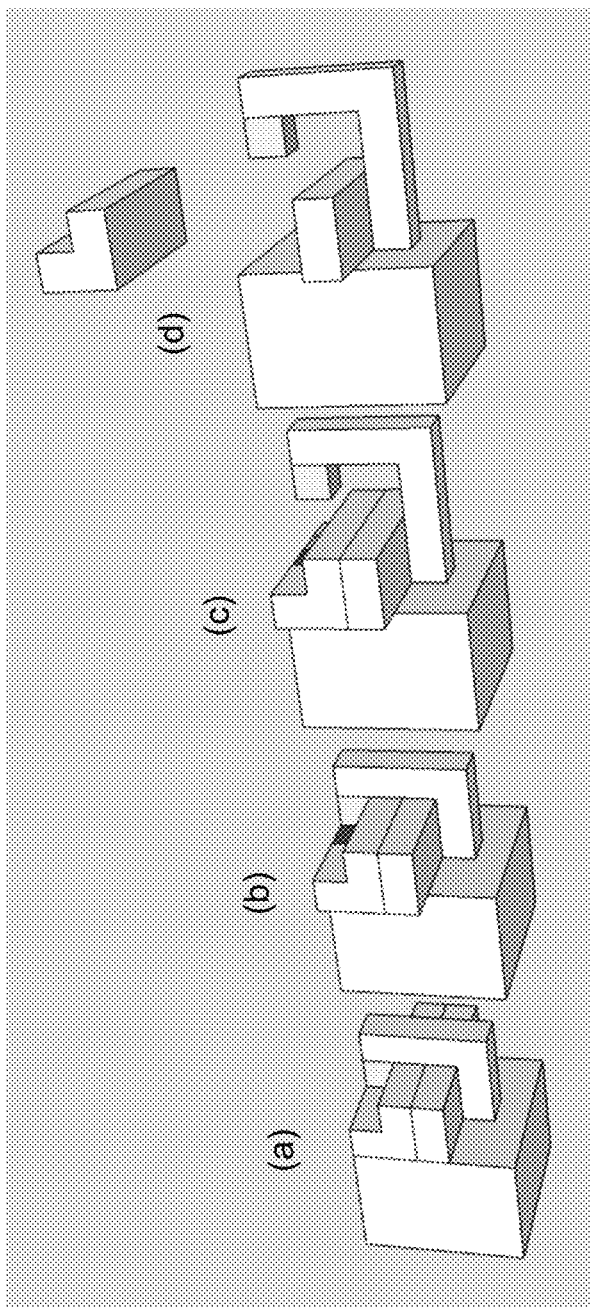
Figure 2C:
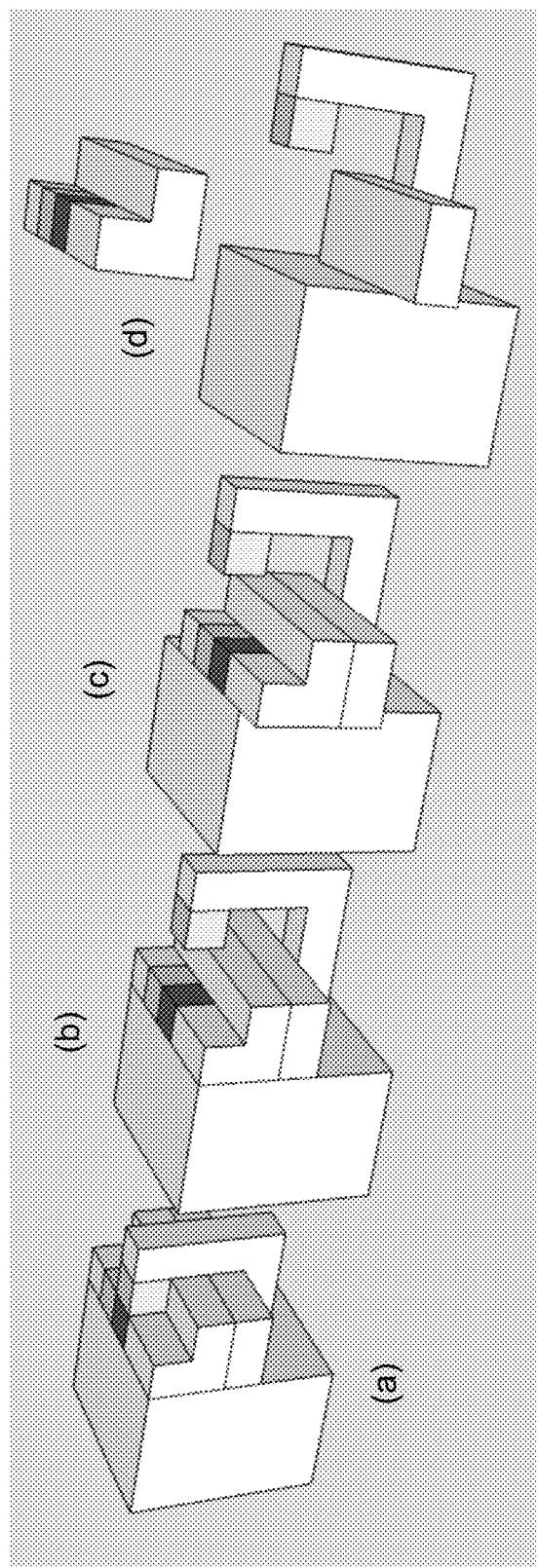

FIGS. 2A to 2C describe a linear clamping and unclamping mechanism that can be used to attach first and second apparatus. These apparatus may be, for example, a pram frame (with wheels) and a pram carry cot. Part 100 is attached, in this example, to the carry cot, whilst part 200 is attached to the pram frame. The clamp is identified by numeral 300, whilst part 400 is an actuator. The part 100 is provided with a pair of linearly spaced magnets that are alternately aligned so that one of the magnets presents a positive end (green) to the clamp 300 whilst the other magnet presents a negative end (red). The clamp 300 is provided with a magnet that presents a positive end (green) to the part 100. The clamp 300 is slidably mounted within the actuator so that it can move between clamping and unclamping positions (generally from left to right in the Figures).

The sequence in FIG. 2A illustrates the transition from clamped to unclamped, progressing from left to right. In the leftmost illustration, opposite poles on the clamp 300 and part 100 are aligned, meaning that the clamp is held against the part 100, clamping parts 100 and 200 together. In order to unclamp the parts, the actuator is slid in the minus Y direction relative to parts 100 and 200, with the clamp 300 also moving (second illustration). This results in the alignment of the positive poles (green), causing the clamp 300 to be pushed away (repelled) from part 100, sliding out of the actuator in the minus X direction (third illustration). This allows the part 100 to be moved in the Z direction separating it from part 200 (fourth illustration). FIG. 2B illustrates this same sequence of step, clamped to unclamped, from a different perspective.

Figure 3A:
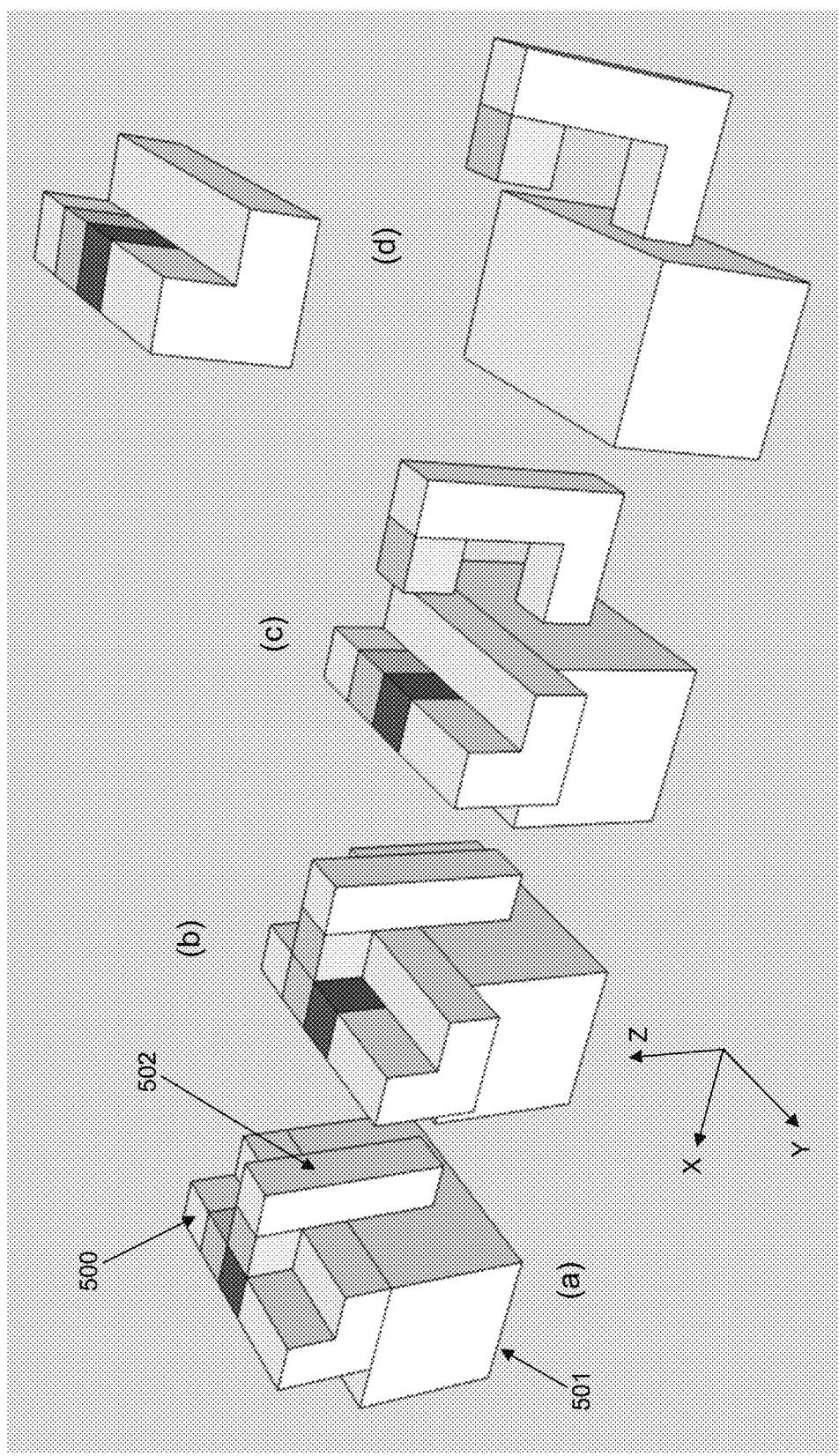
FIGS. 3A and 3B illustrate an alternative linear clamping and unclamping mechanism.
Figure 3B:
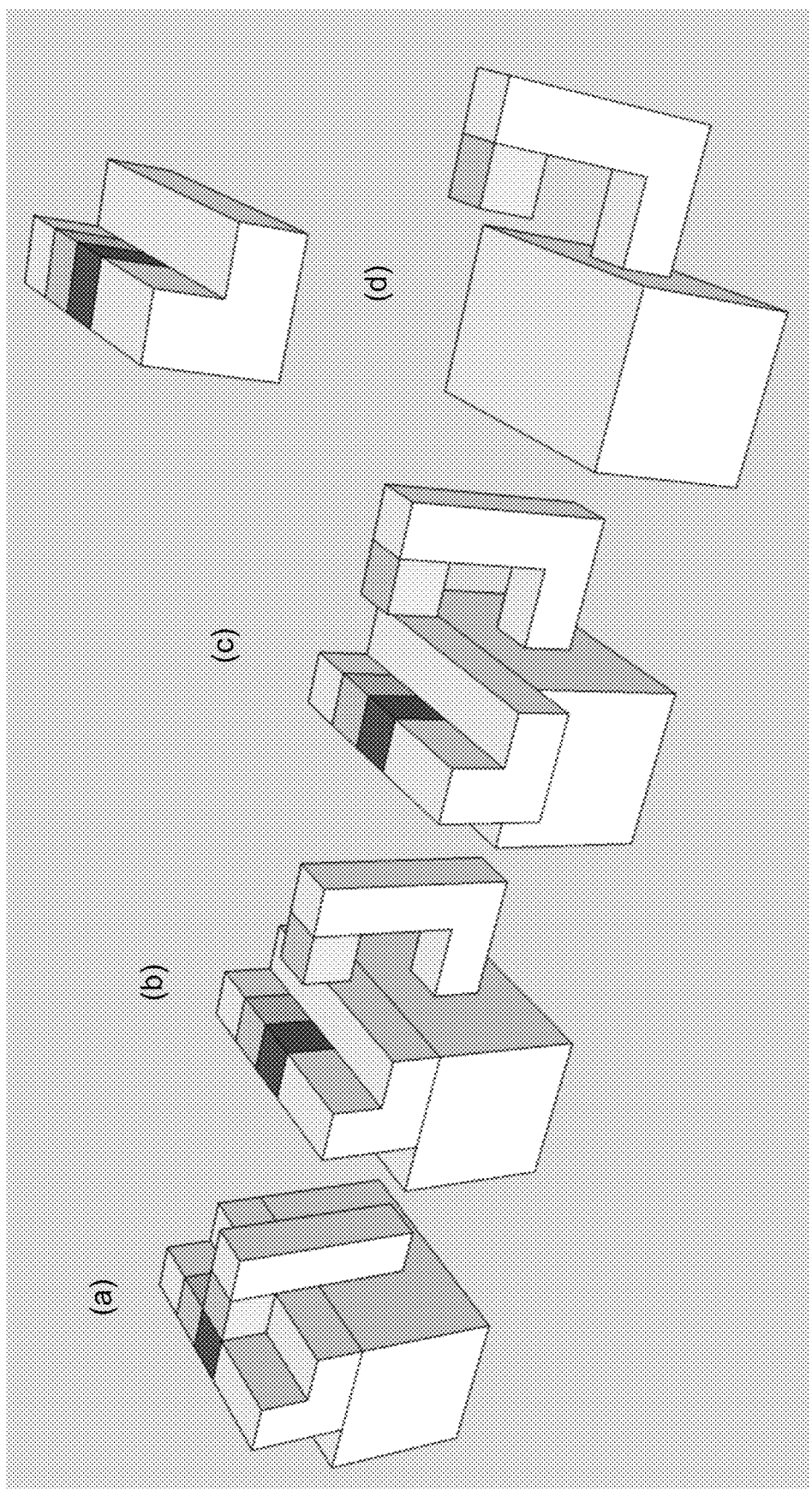

Referring now to FIGS. 3A to 3B, an alternative linear mechanism will now be described. In this mechanism, part 500 may be connected to a pram carry cot whilst part 501 may be connected to the pram frame. A clamp 502 is slideably engaged with a slot in the part 501 so that it can move in the X direction between clamped and unclamped positions. It is assumed that parts 501 and 502 are inaccessible, whilst part 500 can be moved by a user.

FIG. 3A shows the sequence of operations involved in moving between clamped and unclamped positions (from left to right). In the leftmost illustration, the positive (green) and negative (red) poles on parts 500 and 502 are aligned, resulting in attraction and therefore clamping of the parts. In order to unclamp, the user moves part 502 in the Y direction relative to the other parts, thereby aligning the positive (green) poles (second illustration). This causes parts 500 and 502 to be repelled, with the clamp 502 sliding outwards in the slot of part 501 (third illustration). This allows part 500 to be lifted away from part 501 (fourth illustration). FIG. 3B illustrates the corresponding sequence of steps to move from an unclamped to a clamped position (moving from right to left).

With reference to FIGS. 2A-2C and 3A-3B it is noted that, in moving from the clamped to the unclamped positions, a mechanical force may be used to cause or assist separation of the parts. For example, referring to FIG. 2A a ramp may be provided on the surface 101 of the part 100 that faces in the minus X direction. This ramp causes the clamp 300 to move in the minus X direction as the actuator 400 slides in the Z direction. A spring or other biasing means may additionally or alternatively be used to aid separation of the parts.

FIG. 1 describes a mechanism where only one actuating step is required to unclamp the system; the latter being the motion of clamp (3) relatively to parts (1) along the actuation direction (Y). FIG. 4 and above describe a mechanism that requires two actuating steps to unclamp the system. The first step is a motion of part (1) relatively to an actuating part (5), acting on clamp (3), along a direction that is not inside the (X,Y) plan; i.e. typically along a direction that is parallel to the Z axis. The second actuating step is, as before, the previously described actuation motion of clamp (3) relatively to part (1), along the Y direction. This first actuating step is required because, before it is executed, part (1) and actuating part (5) (and, subsequently, clamp (3)) are prevented to move relatively to each other's in the actuation direction Y. Note that clamp (3) does not have to be mechanically prevented from moving relatively to actuating part (5) along the Y direction before the first actuating step is executed provided that it is after. Again, the second actuating step can be linear, rotational or anything else as already discussed above.

Consequently, an additional force is required to keep part (1) positioned relatively to actuating part (5) so that they cannot move relatively to each other's along the direction of motion of the first actuating step. This can be achieved, typically by a spring or by some magnetic material configured so that they act as a spring. Such a system is useful if, for instance, the first part (1) is so large that it is not possible to access easily the actuating part (5) located behind the first part (1).

Figure 5:
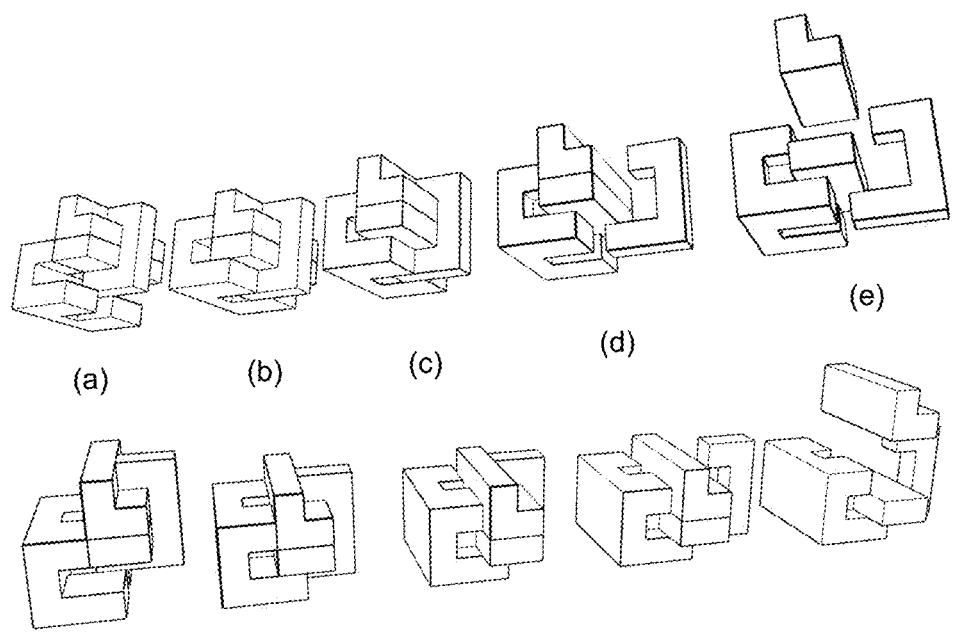
FIGS. 5(*a*)-5(*e*) illustrate the clamping and unclamping of the embodiment of FIG. 4.

This two actuating steps mechanism is illustrated in FIG. 4 and FIG. 5. FIG. 4 is an exploded view of the components involved in FIG. 5. It shows that when the protrusion (11) of the second part (2) is inside the slot (12) carved inside the actuating part (5) the second part (2) and the actuating part (5) cannot move relatively to each other's along the Y direction. In addition, when clamped, parts (1) and (2) cannot move relatively to each other's along the Y direction; thus part (1) cannot move relatively to the actuating part (5). Note that the protrusion could be on the first part (1) or on both parts (1) and (2) and that the locations of the slot and of the protrusion on the parts could be reversed.

FIG. 4 shows the steps required to unclamp and/or to clamp the system described in FIG. 5. The top and bottom figures show the steps from, respectively, a top-down and a bottom-up viewpoints. From left to right, the system goes from clamped to unclamped. First, the system is clamped and parts (1) and (2) cannot move relatively to the actuating part (5) in the Y direction. Second, the first actuating step is executed. As a result, the two parts (1) and (2) and clamp (3) are moved along the -Z directions, relatively to the actuating part (5). Note that they could have moved in the +Z direction. Third, the two parts (1) and (2) moved relatively to both clamp (3) and the actuating part (5), along the Y direction. Fourth, as a result of the previous motion, the unclamping force moves clamp (3) to its unclamping position. Fifth, the first part (1) and the second part (2) can move away from each other's along the Z direction. Note that the clamping manoeuvre can be the opposite sequence of steps, but not necessarily. Indeed, after parts (1) and (2) have been separated, the second part (2) can be moved, relatively to actuating part (5), back to where they were before the first actuating step was executed, but with clamp (3) still in its unclamping position (until the first part (1) is moved again closer to clamp (3)).

Possible applications of the one and two actuating step systems described in this patent include the attachment of electronic devices on or inside a vehicle (such as a bike, a car, a lorry, a plane, a train, a wheelchair etc. . . . ) or on some walls (such as the walls of a house or of a flat etc. . . . ). They also include the attachment of a pram to a push chair.

The invention claimed is:

1. A clamping mechanism comprising:
a first part;
a clamp coupled to said first part to enable the clamp to slide relative to said first part in a first linear direction, the clamp being provided with a first magnetic component;
a second part for clamping by said clamp, the second part being provided with a second magnetic component,
the mechanism being configured such that movement of the clamp in said first linear direction, between a clamping and an unclamped position, is effected by movement of the first part and the clamp, relative to said second part, in a second linear direction substantially orthogonal to said first linear direction as a result of alignment and misalignment of the magnetic components.

2. A clamping mechanism according to claim 1 and configured to clamp said second part directly against said first part.

3. A clamping mechanism according to claim 1 and comprising a third part configured to be clamped by said clamp to said second part.

4. A clamping mechanism according to claim 1, wherein said first magnetic component comprises opposite magnetic poles spaced apart in said second linear direction.

5. A clamping mechanism according to claim 1, wherein said clamp is generally C-shaped.

6. A clamping mechanism according to claim 1, wherein movements in said first and second linear directions occur sequentially or simultaneously.

7. A clamping mechanism comprising:
a first part provided with a first magnetic component;
a second part; and
a third part provided with a second magnetic component and being engageable with the second part,
said parts comprising cooperating features to allow said first part to move in a first linear direction between an unclamped position, in which the third part does not clamp the first and second parts together, and a first unlocked clamped position in which the third part clamps the first and second parts together but the first part is free to move in said first linear direction, and to allow said first part to move in a second linear direction, substantially orthogonal to said first linear direction, between said unlocked clamped position and a locked clamped position in which the first part is prevented from moving in a direction parallel to said first linear direction, movement in said first linear direction causing movement between alignment and misalignment of said first magnetic component and said second magnetic component to effect clamping and unclamping of the first part to the third part.

8. A clamping mechanism according to claim 7, wherein said at least one of said magnetic components is configured to move in a third linear direction, substantially orthogonal to said first and second linear directions, as a result of alignment and misalignment of the magnetic components.

* * * * *